United States Patent
Beck et al.

(10) Patent No.: US 6,976,572 B2
(45) Date of Patent: Dec. 20, 2005

(54) METHOD AND SYSTEM FOR SYNCHRONIZING LOADS BEFORE INJECTION ON A TILT TRAY TYPE SORTING SYSTEM

(75) Inventors: David Beck, Hull (GB); Nathan Wood, Hull (GB); Alain De Vos, Lennik (BE)

(73) Assignee: Fabricom Airport Systems UK Ltd, Hull (GB)

( * ) Notice: Subject to any disclaimer, the term of this patent is extended or adjusted under 35 U.S.C. 154(b) by 0 days.

(21) Appl. No.: 10/469,607

(22) PCT Filed: Feb. 28, 2002

(86) PCT No.: PCT/EP02/02173

§ 371 (c)(1),
(2), (4) Date: Mar. 5, 2004

(87) PCT Pub. No.: WO02/070380

PCT Pub. Date: Sep. 12, 2002

(65) Prior Publication Data

US 2004/0134751 A1    Jul. 15, 2004

(30) Foreign Application Priority Data

Mar. 2, 2001  (FR)  .................................. 01 02854

(51) Int. Cl.⁷ ............................................ B65G 43/00
(52) U.S. Cl. .................................. 198/358; 198/460.1
(58) Field of Search ............................ 198/357, 358, 198/460.1, 461.1

(56) References Cited

U.S. PATENT DOCUMENTS

| | | | | |
|---|---|---|---|---|
| 4,140,213 A | * | 2/1979 | Denison | 198/358 |
| 4,717,013 A | * | 1/1988 | Reissmann et al. | 198/461.1 |
| 5,341,915 A | * | 8/1994 | Cordia et al. | 198/460.1 |
| 5,341,916 A | | 8/1994 | Kohls et al. | |
| 5,634,551 A | * | 6/1997 | Francioni et al. | 198/460.1 |
| 5,906,265 A | * | 5/1999 | Spatafora | 198/460.2 |
| 6,129,199 A | * | 10/2000 | Gretener et al. | 198/357 |
| 6,209,703 B1 | * | 4/2001 | Soldavini | 198/370.06 |
| 6,253,904 B1 | * | 7/2001 | Soldavini | 198/431 |

FOREIGN PATENT DOCUMENTS

EP   0 577 021    1/1994

* cited by examiner

Primary Examiner—James R. Bidwell
(74) Attorney, Agent, or Firm—Young & Thompson

(57) ABSTRACT

A method for synchronizing loads before the injection thereof on a sorting machine, consisting of trays which pass in front of an injection system comprising conveyors for moving the loads towards an injection site, a synchronization conveyor for positioning a load in order to place it on a tray, a device for injecting a load from the synchronization conveyor onto the machine and a cell for detecting the position of the loads at the exit of the synchronization conveyor. When a load passes the cell, the synchronization conveyor and the injection device are reversed and accelerated slightly to a top speed of $V_{AR}$, so that the load returns to obscure the cell; the reverse movement is maintained until the cell is no longer obscured; and the synchronization conveyor is moved forward and accelerated slightly to a top speed of $V_{AV}$ until the cell is obscured.

12 Claims, 5 Drawing Sheets

METHOD AND SYSTEM FOR SYNCHRONIZING LOADS BEFORE INJECTION ON A TILT TRAY TYPE SORTING SYSTEM

BACKGROUND OF THE INVENTION

The present invention relates to a method for synchronizing loads before injection onto a sorting system, in particular a tilt tray type sorting machine. It also relates to a system for the implementation of this method.

These machines are made up of a chain of carts moving around a track, generally in a loop, but which can also be in the form of a rail circuit with semi-autonomous carts using DCV technology, at a predetermined non-zero speed. Each cart is equipped with a tilt tray, which allows for the load being carried to be discharged at a predetermined location, according to known processes.

The invention relates to the injection method, that is, the process allowing for a pre-determined tray to be loaded with a load such as a parcel or a piece of baggage.

Particularly with regard to baggage, the loads have a wide variety of geometrical shapes, materials and various appendages (straps, belts, retractable wheels, etc.) and are of variable masses, which makes their grip, and consequently their kinematic behaviour, practically unpredictable.

The invention describes a method for improving the reliability of injection, that is, the correct positioning of each load taken individually on a sorting machine tray.

The arrows indicate the direction of movement of the loads.

FIG. 1A shows a top view of a set of trays 1AP moving at a pre-determined speed in front of the injection device, which is made up of the following, in the order of movement of the loads:

two spacer type conveyors 1AQ1, 1AQ2 well known in the art, which ensure the movement of the loads one by one towards the actual injection device, a synchronization conveyor 1AS, the function of which is to place the load in a position allowing for it to be placed on a tray in ballistic mode, an injection device 1AI, generally made up of a set of drive belts, which carries out such placement.

The loads are individually presented to the conveyor 1AS according to known processes, which consist of positioning them one by one so that their front edge obscures the photoelectric cells 1AQ1C, 1AQ2C.

As soon as the conveyor 1AS is emptied of the previous load, the conveyor is started according to a pre-determined acceleration law $\gamma 1$ until the cell 1AS1 is obscured, and then according to a pre-determined acceleration law $\gamma 2$ until the cell 1AS2 is obscured.

At this stage, the controls simultaneously start the conveyor 1AS and the injection device 1AI to give the load a speed, the component in the direction of travel of the trays on the sorting machine of which is equal to the linear speed of the said trays.

As a point of information, injection at 45° relative to the sorting machine means that this injection speed is of the order of $\sqrt{2}\times$ the linear speed of the sorting machine. The means of stabilizing the load despite the transverse component are known. This only occurs when the motorized conveyors are driving the load without any notable sliding or rolling, as shown in FIG. 1B.

When the load does not have the required grip or is likely to roll on the conveyors, the situation is as shown in FIG. 1C, where the load has overshot the obscuring position for the cell 1AS2.

In the known state of the art, this situation, which means that the correct placing of the load on a tray on the sorting machine cannot be foreseen, can be detected.

In the known state of the art, the automatic controls trigger an alarm (for example a stop and a light signal) to request human intervention.

There are injection lines in the known state of the art known as dynamic injection lines, designed in such a way that they only stop the loads if the sorting machine does not have sufficient empty trays to allow for the load to continue moving.

However, if this is not the case, this type of injection line, which largely reproduces the risk related to the load sliding or rolling as already described, also has a stand-by stop.

The management of such incidents presents a certain number of known disadvantages, particularly when the injection line is part of a baggage handling and sorting system.

One of the requirements of such systems is the systematic inspection of the baggage for the detection of any suspicious contents such as explosives.

Such detection takes place through the insertion of a specialist apparatus and intermediate conveyor means upstream of the injection line for final sorting, as illustrated in the diagram in FIG. 1D.

This apparatus includes:

baggage identification means (1D1), for example the optical reading of a bar code printed on a label when the baggage was checked in, means of detecting the possible presence of suspicious contents (1D2), such as X-ray apparatus.

After identification, the intermediate conveyor devices and the injection must use known methods to reliably monitor the position of the baggage, in order to keep track of the identification and status, suspicious or not, of each checked piece of baggage.

For example, it is customary to use a sorting machine to send both risk-free baggage to its final destination (aircraft loading station) and baggage that presents a risk to stations for closer inspection.

The slippage of a piece of baggage on injection therefore creates a situation of uncertainty with regard to the location of one or even several pieces of baggage.

In the known injection techniques, the detection of a slippage requires human intervention that consists of:

either removing the piece of baggage for manual handling, or repositioning it so that it obscures the cell 1AS2 again, which, as long as the control means permit, allows for the normal process to continue with the loss of monitoring considered to be corrected.

In any case, the said human intervention results in:

operating costs linked to the availability of sufficient competent operators, risks linked to human error with regard to security.

For example, some baggage sorting installations are manned to this end by as many operators as injections, thus considerably adding to operating expenses.

In any case, each injection stoppage results in a loss of throughput that prejudices the operational output of the system.

SUMMARY OF THE INVENTION

The aim of the present invention is to remedy these disadvantages by proposing an injection procedure that in most cases allows for the positioning of the loads to be automatically corrected before injection, so that human intervention and the related costs are significantly reduced.

This aim is achieved with a method for synchronizing loads before their injection onto a tilt tray type sorting machine, this machine having a set of trays moving at a pre-determined speed in front of an injection system made up of conveyor means to move the loads one by one towards an injection site, a so-called synchronization conveyor 1AS to place a load coming from the said conveyor means in a position allowing for it to be placed on a tray in ballistic mode, a device 1Al to inject a load coming from the said synchronization conveyor onto the sorting machine, and means of detecting the position of the loads within the injection system comprising a detection cell arranged approximately at the exit of the synchronization conveyor.

According to the invention, when a load has overshot the exit detection cell, the following stages take place:
  control of the synchronization conveyor 1AS and the injection device 1Al according to a reversal with slight acceleration and a top speed of a pre-determined value $V_{AR}$, so that the load returns to obscure the exit detection cell 1AS2,
  continuation of the reversal control until the exit detection cell 1AS2 is no longer obscured, and then for a pre-determined period, and
  control of the synchronization conveyor according to a movement forwards with slight acceleration and a top speed of a predetermined value $V_{AV}$ until the exit detection cell 1AS2 is obscured.

This method also increases the security of the baggage handling systems by correcting the reliable monitoring of the said baggage.

An important characteristic of the method is that it does not usually require any additional material resources during the electromechanical design of the injection lines.

Moreover, it is applicable to injections already in service in existing installations, which consequently allows for a clear reduction in the operating costs of such installations.

The invention applies equally to known start/stop type injections, where each load pauses for synchronization with the sorting machine, or dynamic injections, where this pause only occurs if the trays that could be aimed for according to a continuous process are occupied.

The synchronization method according to the invention generally comprises the following stages:
  movement forwards control of the said conveyors and the synchronization conveyor according to a first pre-determined control law, until a second detection cell is obscured,
  movement forwards control of the synchronization conveyor according to a second pre-determined control law, until the exit detection cell is obscured,
  at the end of a pre-determined dwell time, test of the exit detection cell.

This method is therefore characterized by the following stages:
  if the test indicates that the said exit detection cell is still obscured, operation of the injection device,
  if the said exit detection cell is not obscured, reversal control of the synchronization conveyor and the injection device according to a third pre-determined control law, until the exit detection cell is obscured,
  continued reversal control of the synchronization conveyor according to a fourth pre-determined control law until the exit detection cell is no longer obscured,
  stopping control of the synchronization conveyor 1AS for a pre-determined period, and
  movement forwards control of the synchronization conveyor according to a fifth pre-determined control law, until the exit detection cell is obscured.

The successive stages of the control of the synchronization conveyor and the injection device according to either the first, second, third, fourth or fifth control law are advantageously repeated until the exit detection cell test shows that the said exit detection cell is still obscured after a pre-determined dwell time.

The synchronization method according to the invention is, for example, implemented by programming a synchronization control unit, in connection with the control of drive motors for the synchronization conveyor and the injection device, the said synchronization control unit being equipped to receive signals sent by the exit cells.

It can thus be implemented on a specific synchronization control unit added to a pre-existing injection command/control equipment.

In this configuration, the control signals for the synchronization conveyor and injection device drive motors generated by the pre-existing control equipment are reproduced exactly at the terminals of the specific control unit, and the specific control unit is provided with a loss of synchronization alarm signal generated by the pre-existing command/control equipment.

According to another aspect of the invention, a system is proposed to synchronize loads before their injection onto a tilt tray type sorting machine, for the implementation of the synchronization method according to any one of the previous claims, characterized in that it comprises:
  first means to control the synchronization conveyor and the injection device, when a load has overshot the exit detection cell, according to a reversal with slight acceleration and a top speed of a pre-determined value $V_{AR}$, so that the load returns to obscure the exit detection cell,
  these first control means being designed to be activated until the exit detection cell is no longer obscured, and for a predetermined period, and
  second means to control the conveyor according to a forward movement with slight acceleration and a top speed of a pre-determined value $V_{AV}$ until the exit detection cell is obscured.

The synchronization system according to the invention can be embodied in the form of a specific control unit dedicated to synchronization, transparent to a pre-existing injection command/control unit. It may also comprise an additional detection cell to replace or supplement a pre-existing exit detection cell.

The synchronization system according to the invention may be implemented on a dynamic injection site comprising at least one synchronization conveyor with a load stop position and a synchronization sensor.

The description below gives other specific features and advantages of the invention. On the attached drawings, given as non-limitative examples,

DESCRIPTION OF THE PREFERRED EMBODIMENTS

For the implementation of the synchronization method according to the invention, the drive motors of the synchronization conveyor 1AS and injection device 1Al must have two directions of movement. The control for these motors must in practice be a speed variator, allowing for pre-determined control of the acceleration and drive speed.

Figure 1A:
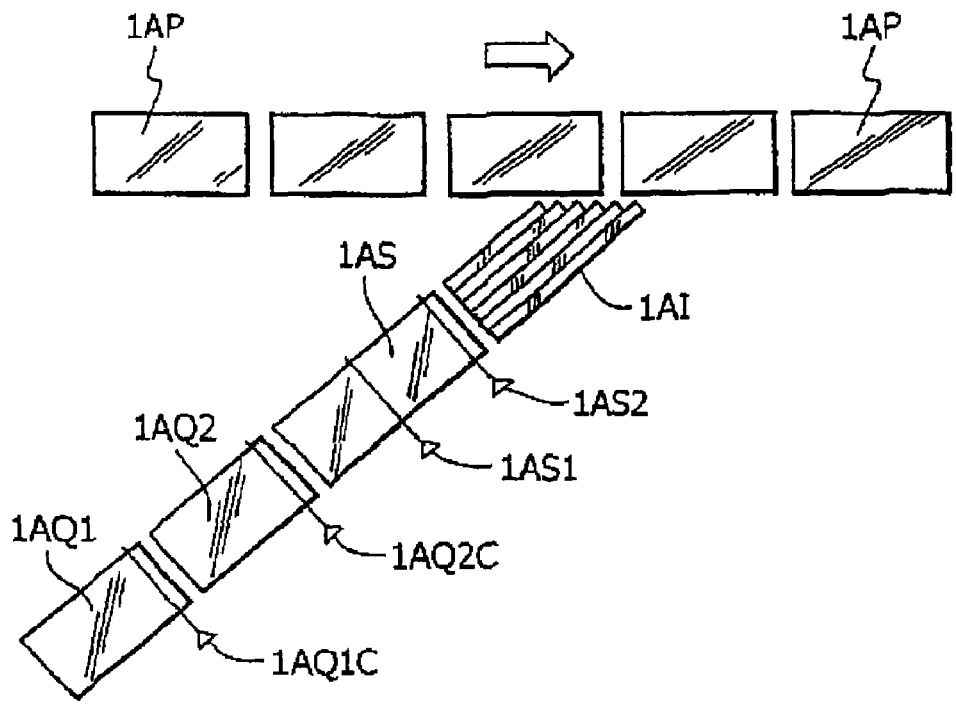
FIG. 1A describes the construction of a normal start/stop type injection line, using motorized conveyors.
Figure 1B:
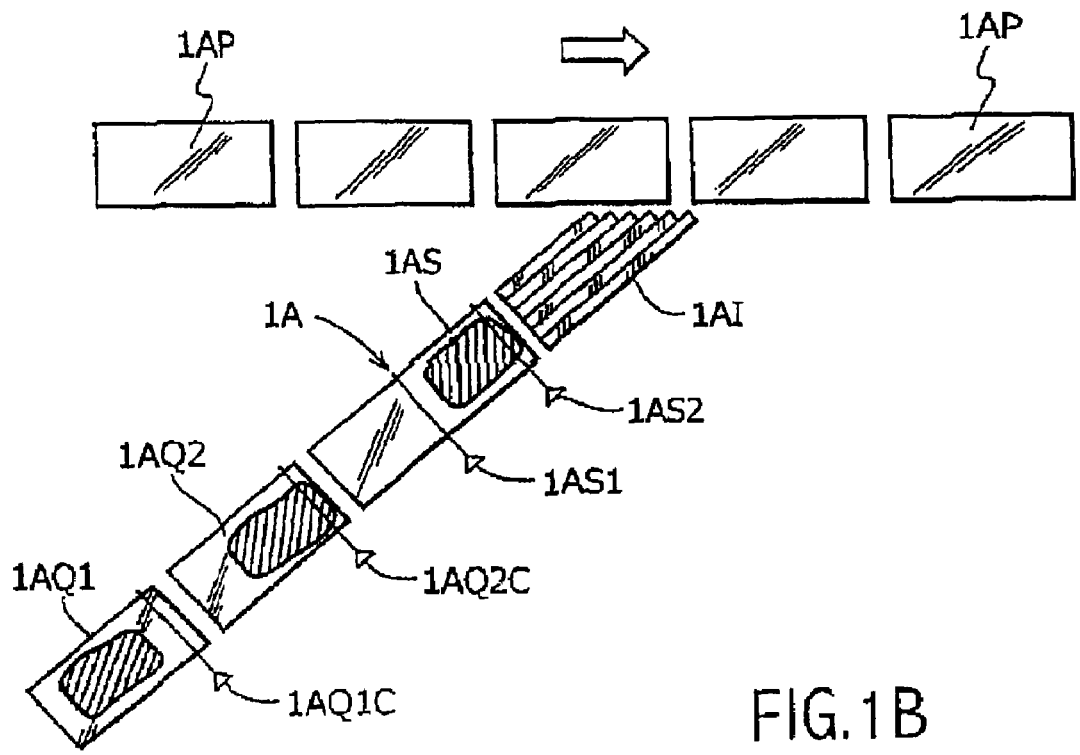
FIG. 1B illustrates the normal positioning of a load before injection onto a sorting machine.
Figure 1C:
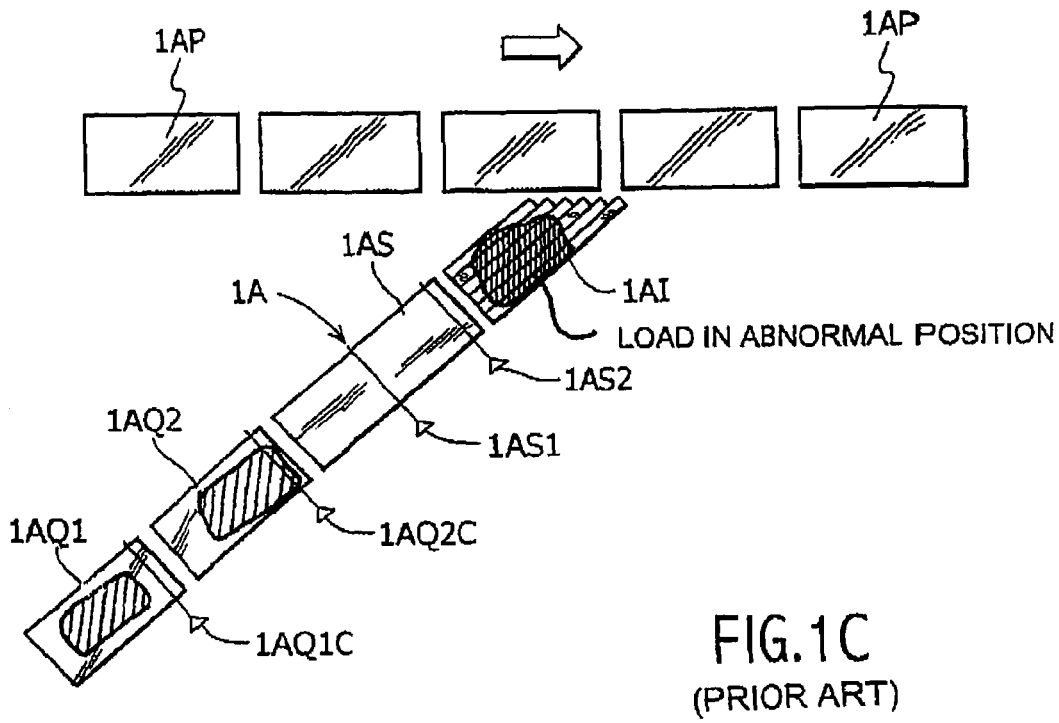
FIG. 1C illustrates the abnormal positioning of a sliding or rolling load on an injection line.
Figure 1D:
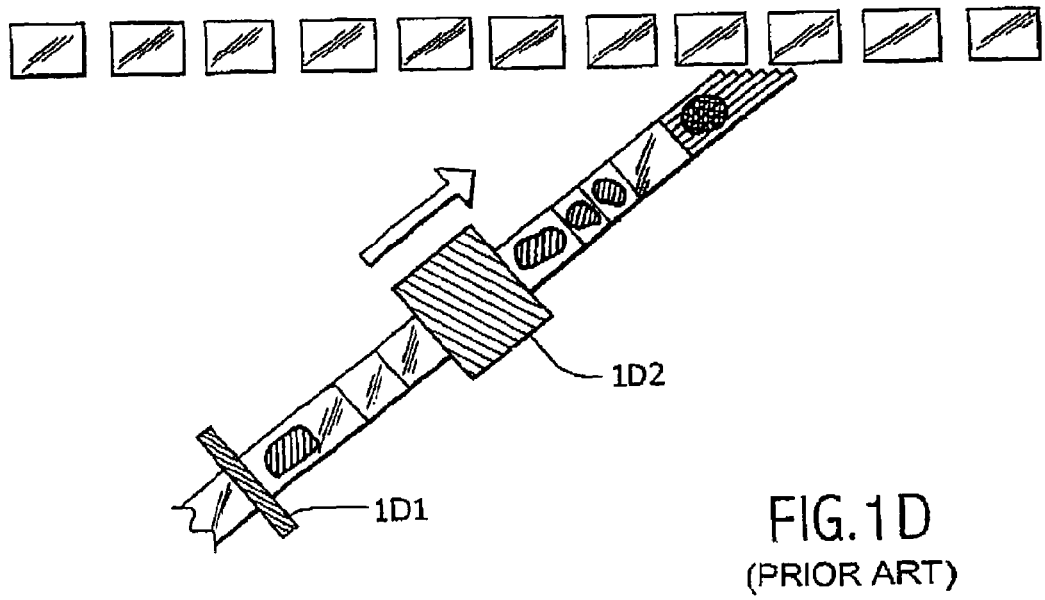
FIG. 1D illustrates the position of an injection line in a security check circuit for a baggage handling system.
Figure 2A:
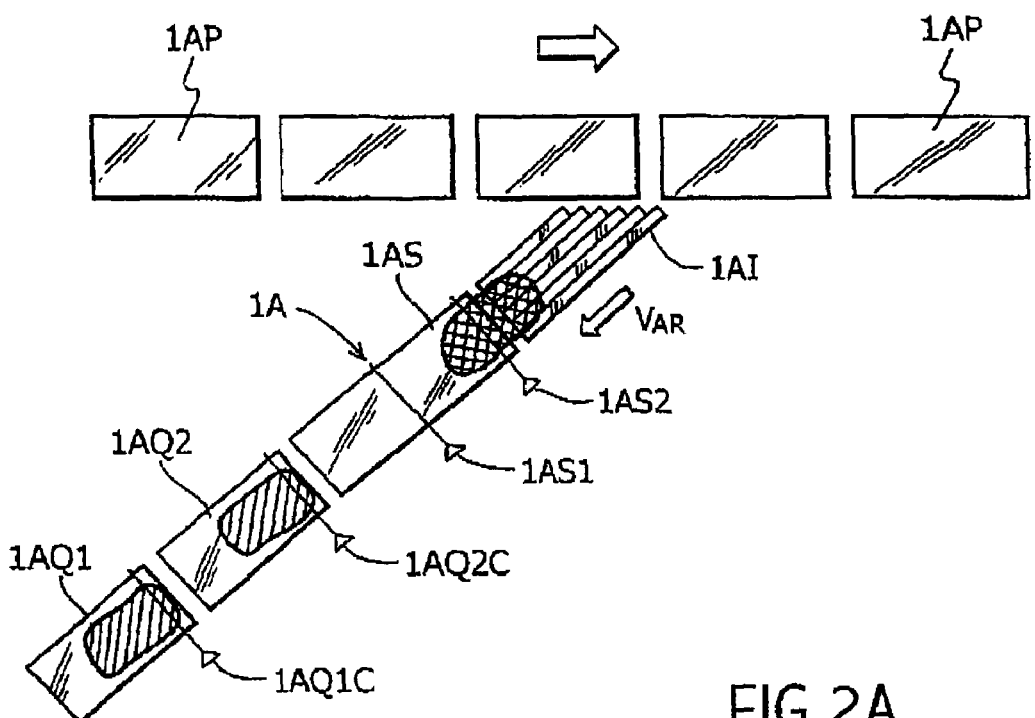
FIG. 2A shows, in a first embodiment of a synchronization system according to the invention, a reversal sequence of the synchronization conveyor and the injection device.
Figure 2B:
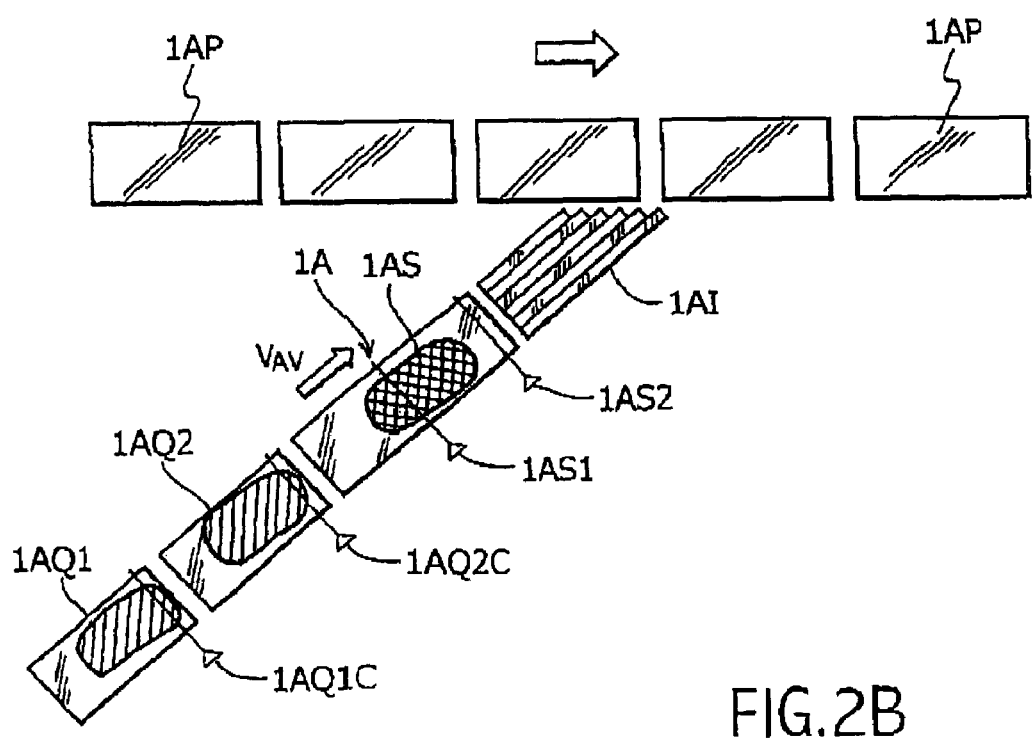
FIG. 2B shows, in this first embodiment, the continuation of the reversal sequence.
Figure 2C:
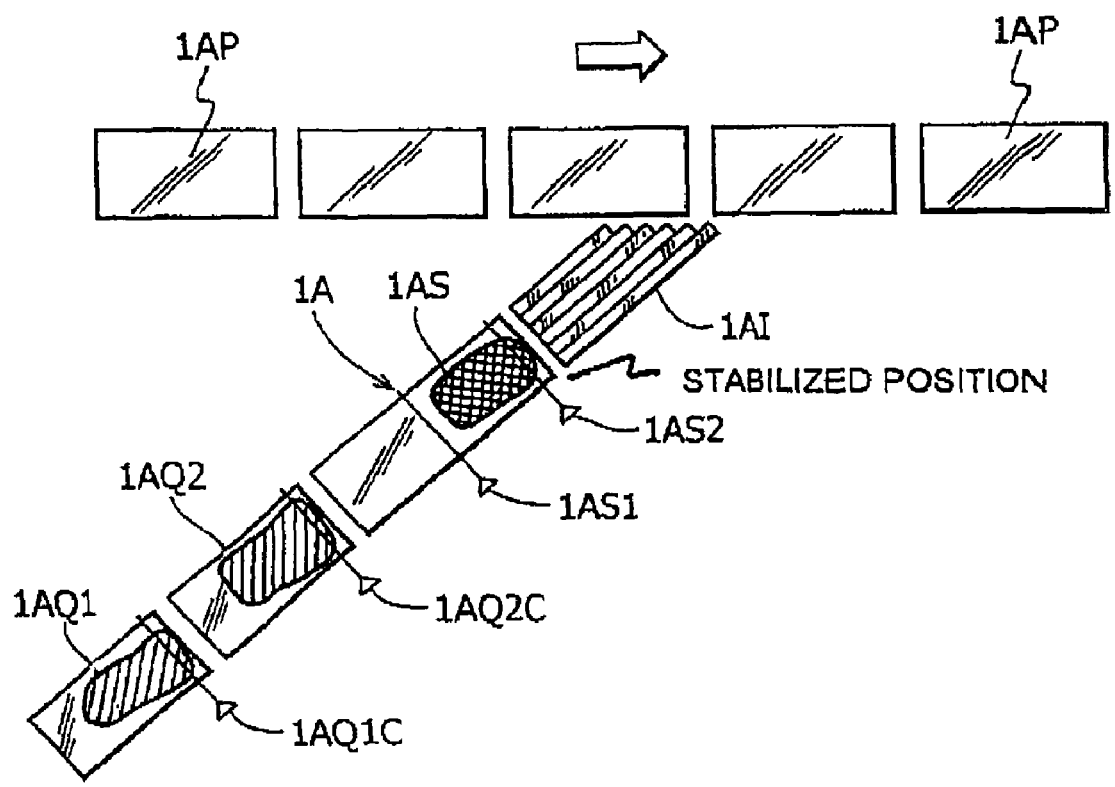
FIG. 2C shows, in this first embodiment, a subsequent forward movement sequence of the synchronization conveyor and the injection device.

When a load has overshot the exit detection cell 1AS2, the following stages take place within the context of the synchronization method according to the invention:

communicating to the synchronization conveyor 1AS and the injection device 1Al a reversal (FIG. 2A) with slight acceleration and a top speed of a predetermined value $V_{AR}$, so that the load returns to obscure the cell 1AS2 normally, continuating this movement until the cell 1AS2 is no longer obscured (FIG. 2B) and then continuation for a pre-determined period: at this point, the injection device 1Al motor is restored to its normal movement direction and setting, communicating to the conveyor a forward movement (FIG. 2C) with slight acceleration and a top speed of a predetermined value $V_{AV}$ until the cell 1AS2 is obscured.

The aim of the synchronization method according to the invention described above is thus to return the load to the normally planned position before the actual injection movement.

The speed setting values are chosen so that most loads that are unstable at a normal speed can be driven without sliding or rolling.

Because the synchronization method is automatic and the only load existing on the perimeter of the conveyors 1AS and 1Al can only be that previously introduced from the spacer conveyor 1AQ2, the complete accomplishment of the manoeuvre restores the monitoring of the load, i.e. the link between the identity of the load and its position is re-established.

The complete synchronization process, with correction to restore the positioning and monitoring of the load in the event that it slides or rolls, is broken down into stages, the first four of which are known in the prior art, namely:

1) according to a first pre-determined law, the conveyor 1AQ2 and the synchronization conveyor 1AS are controlled in forward movement until the cell 1AS1 is obscured, 2) according to a second pre-determined law, the conveyor 1AS is controlled in forward movement until the cell 1AS2 is obscured, 3) a predetermined dwell time is observed, 4) the cell 1AS2 is tested again, 5) if the cell is still obscured, the actual injection movement is triggered, synchronized with the passing of an empty tray; if it is not, an alarm is triggered to request human intervention.

Of course, each of stages (1) to (3) is accompanied by a dwell time limit for the detection of other faults outside the scope of the invention.

The synchronization method according to the invention consists in particular of replacing stage (5) by stage (6) and the following stages:

6) if the cell is still obscured, the actual injection movement is triggered; if it is not, according to a third predetermined law the conveyors 1Al and 1AS are controlled in reverse until the cell 1AS2 is obscured, 7) according to a fourth pre-determined law, the conveyor 1AS continues in reverse until the cell 1AS2 is no longer obscured, 8) conveyor 1AS is stopped, and a predetermined dwell time is observed (optionally zero), 9) according to a fifth pre-determined law, the conveyor 1AS is controlled in a forward movement until the cell 1AS2 is obscured, 10) stages (3) to (5) are carried out.

Each of the movement stages (6) to (9) is accompanied by a dwell time limit for the detection of other faults outside the scope of the invention.

Technically, the synchronization method according to the invention may be embodied by the programming of a control unit such as an industrial controller of any known type, in connection with the control of the motors for the conveyors 1AS and 1Al and the cells 1AS1 and 1AS2.

According to a first embodiment of the invention, the method is advantageously integrated into the injection from the design stage.

Figure 3:
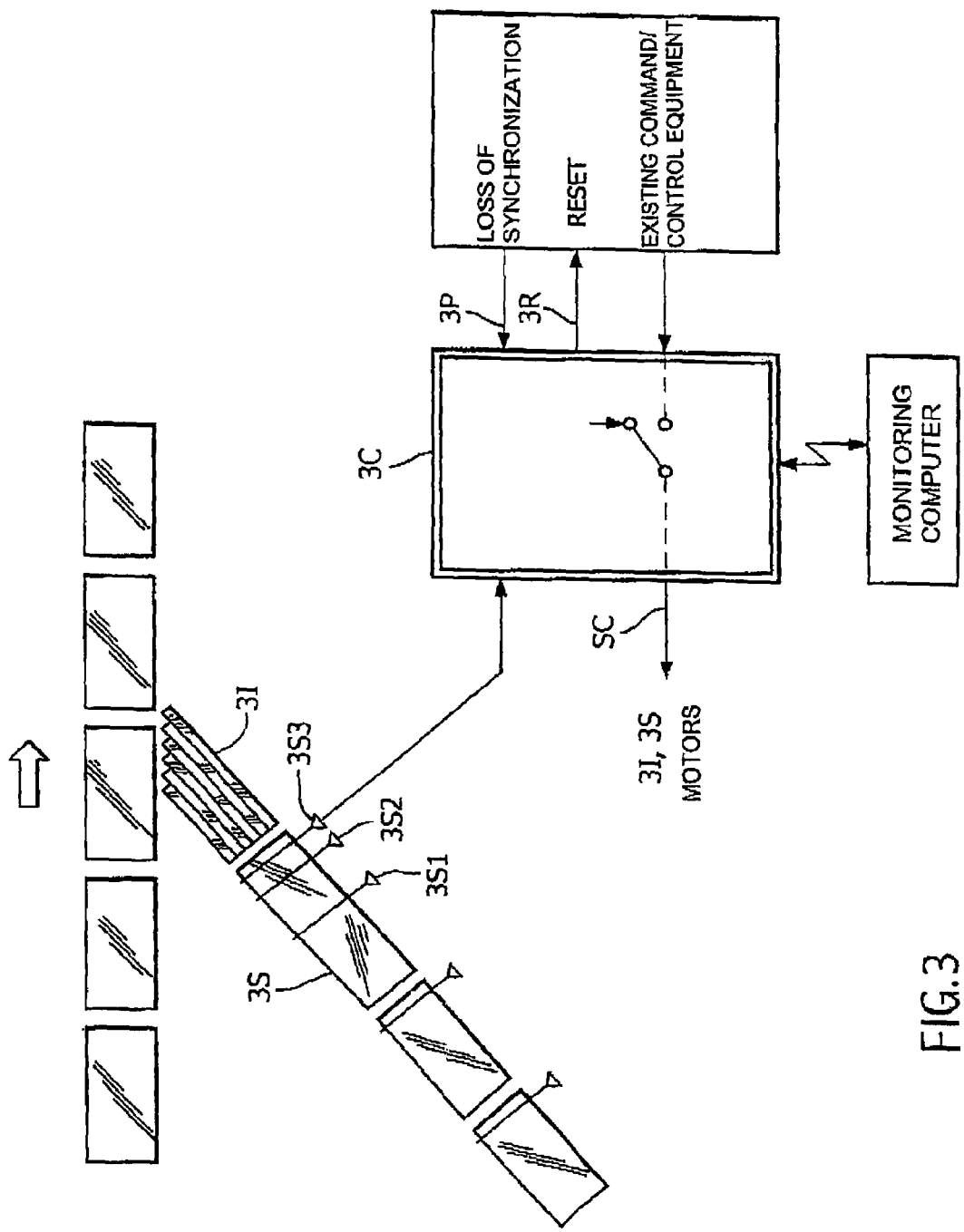
FIG. 3 shows a second embodiment of a synchronization system according to the invention.

According to a second embodiment described in FIG. 3, the synchronization method according to the invention is managed by a specific piece of equipment that is added to a preexisting injection. This second embodiment is advantageously applicable to a sorting installation that is already in regular service, with no need to alter either the mechanics or the pre-existing command/control equipment.

The operation to implement the invention consists of:

replacing or modifying speed variators of the existing synchronization conveyor 3S and of the existing injection device 3I to obtain two directions of movement and a range of speed settings allowing for the method to be implemented.

exactly reproducing the control signals SC of the motors that are known by the pre-existing command/control equipment, at the terminals of the specific control unit 3C, connecting the "loss of synchronization" alarm signal 3P generated by the pre-existing command/control equipment to the unit 3C, optionally, installing an additional cell 3S3 if the position of the pre-existing cell 3S2 is not suitable, and connecting either 3S3 or 3S2 in parallel to the unit 3C, connecting an output from the specific control unit 3C to the reset input 3R of the existing command/control equipment, if necessary, connecting the specific control unit 3C to the installation monitoring computer, via a data transmission link 3T.

In normal operation, the specific control unit 3C, which may be an industrial controller, is completely neutral and "transparent" to the existing command/control equipment.

When the existing command/control equipment emits the alarm signal 3P, it is known in advance that this command/control equipment has suspended all movement, waiting for an intervention.

From this moment, the specific control unit 3C takes control of the conveyors 3S and 3I, to carry out the method according to stages (6) to (9) described above, using the preexisting cell 3S2 or the auxiliary cell 3S3 as a guide.

If the manoeuvre fails (due to the expiry of the guard timers), the specific control unit 3C simply gives control of the motors to the preexisting command/control equipment.

If the manoeuvre succeeds, the specific control unit 3C resets the existing command/control equipment and then gives it control of the motors.

Any installation of this type is designed to return to normal operation after an interruption such as a power failure. Therefore, when it has been reset, the existing command/control equipment returns to a normal situation and will complete the injection.

Generally, the existing command/control equipment will have sent a fault message to the monitoring computer. The data link 3T is provided to this end, to send this same computer a specific fault cancellation message.

Of course, the invention is not limited to the examples described above and numerous adjustments can be made to these examples without leaving the scope of the invention.

A person skilled in the art will easily understand that the invention naturally extends to dynamic injections, where there is at least one synchronization conveyor with a load stop position and a specific sensor analogous to the cells 1AS2 or 3S2 described above. A person skilled in the art will also understand that it is easy, simply by using relays, to create specific control units that are totally transparent to existing command/control equipment to control the motors. In this case, the power to the specific unit must simply be cut off to return fully to the prior operation. This last point is important for intervention on systems In regular service, on which only a few hours per day (for example, the closure of an airport at night) are generally available to carry out the modification.

Thus, the synchronization method according to the invention may equally be implemented on new systems and on systems in service, and provides in all cases a significant reduction in the injection failure rate and consequently a rapid return on investment and/or improved performance of the sorting machines.

It is also important to note that in terms of airport security, the clear reduction in losses of monitoring and human intervention provides additional quality in the so-called hold baggage control chain.

What is claimed is:

1. Method for synchronizing loads before their injection onto a tilt tray type sorting machine, this machine comprising a set of trays (1AP) moving at a pre-determined speed in front of an injection system comprising conveyor means (1AQ1, 1AQ2) to advance the loads one by one towards an injection site, a synchronization conveyor (1AS) to position a load coming from the said conveyor means in a position allowing for it to be placed on a tray in ballistic mode, a device (1Al) for injecting a load coming from the said synchronization conveyor onto the sorting machine, and means of detecting the position of the loads within the injection system comprising a detection cell (1AS2) arranged approximately at the exit of the synchronization conveyor (1AS), characterized in that when a load has overshot the exit detection cell (1AS2), the following stages take place:

control of the synchronization conveyor (1AS) and the injection device 1Al according to a reverse movement with slight acceleration and a top speed of a pre-determined value $V_{AR}$, so that the load returns to obscure the exit detection cell (1AS2), continuation of the reversal control unit the exit detection cell (1AS2) is no longer obscured, and then for a pre-determined period, and control of the synchronization conveyor according to a forward movement with slight acceleration and a top speed of a pre-determined value $V_{AV}$ until the exit detection cell (1AS2) is obscured.

2. Method according to claim 1, comprising the following stages:

control of the said conveyor means and the synchronization conveyor (1AS) in a forward movement according to a first pre-determined control law, until a second detection cell (1AS1) is obscured, control of the synchronization conveyor (1AS) in a forward movement according to a second pre-determined control law, until the exit detection cell (1AS2) is obscured, at the end of a pre-determined dwell time, testing of the exit detection cell (1AS2), characterized by the following stages:

if this test shows that the said exit detection cell (1AS2) is still obscured, operation of the injection device (1Al), if the said exit detection cell (1AS2) is not obscured, control of the synchronization conveyor (1AS) and the injection device (1Al) in reverse mode according to a third pre-determined control law, until the exit detection cell (1AS2) is obscured, continuation of the reverse control of the synchronization conveyor (1AS) according to a fourth pre-determined control law, until the exit detection cell (1AS2) is no longer obscured, stop control of the synchronization conveyor (1AS) for a pre-determined period, and control of the synchronization conveyor (1AS) in forward mode according to a fifth pre-determined control law, until the exit detection cell is obscured.

3. Synchronisation method according to claim 2, characterized in that the successive control stages of the synchronization conveyor and the injection device according successively to the first, second, third, fourth and fifth control laws are repeated until the exit detection cell test shows that the said exit detection cell is still obscured at the end of a pre-determined dwell time.

4. Method according to claim 1, characterized in that it is implemented by programming a synchronization control unit, in connection with the control of motors for driving the synchronization conveyor (1AS) and the injection device (1Al), the said synchronization control unit being equipped to receive signals sent by the exit detection cells (1AS1) and (1AS2).

5. Method according to claim 1, characterized in that it is implemented in a specific synchronization control unit added to pre-existing injection command/control equipment.

6. Method according to claim 5, characterized by the following stages:
- control signals (SC) for drive motors for the synchronization conveyor and injection device generated by the pre-existing command/control equipment are reproduced exactly at the terminals of the specific control unit (3C), and
- the specific control unit (3C) is provided with a loss of synchronization alarm signal (3P) generated by the pre-existing command and control equipment.

7. System for synchronizing loads before their injection onto a tilt tray type sorting machine, for the implementation of the synchronization method according to claim 1, characterized in that it comprises:
- first means to control the synchronization conveyor (1AS) and the injection device (1AI), when a load has overshot the cell (1AS2), in a reverse movement with slight acceleration and a top speed of a pre-determined value $V_{AR}$, so that the load returns to obscure the cell (1AS2), these first control means being designed to be activated until the cell (1AS2) is no longer obscured, and for a pre-determined period, and
- second means to control the conveyor in a forward movement with slight acceleration and to a top speed of a pre-determined value $V_{AV}$ until the cell is obscured (1AS2).

8. System according to claim 7, characterized in that it is embodied in the form of a specific control unit dedicated to synchronization.

9. System according to claim 8, characterized in that it also comprises an additional detection cell (3S3) to replace or supplement a pre-existing exit detection cell (3S2).

10. System according to claim 8, characterized in that the specific control unit (3C) is connected to a monitoring computer for the sorting installation, via a data link (3T), in particular to transmit a fault message and a fault cancellation message.

11. System according to claim 7, characterized in that it is implemented on a dynamic injection site comprising at least one synchronization conveyor with a load stop position and a synchronization sensor.

12. Application of the synchronization method according to claim 1 to an existing baggage sorting system.

* * * * *